(12) United States Patent
Martin et al.

(10) Patent No.: US 11,924,264 B2
(45) Date of Patent: *Mar. 5, 2024

(54) ESTABLISHING TRUST NETWORKS IN A COMMUNAL MEDIA SESSION

(71) Applicant: Groopview Inc., Philadelplia, PA (US)

(72) Inventors: John Jeff Martin, Hillsborough, CA (US); Delmond Newton, Philadelphia, PA (US); Krishnan Rajam, Germantown, MD (US)

(73) Assignee: GROOPVIEW INC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,110

(22) Filed: Apr. 3, 2023

(65) Prior Publication Data
US 2023/0239335 A1 Jul. 27, 2023

Related U.S. Application Data

(63) Continuation-in-part of application No. 17/533,474, filed on Nov. 23, 2021, now Pat. No. 11,722,543,
(Continued)

(51) Int. Cl.
*H04L 65/60* (2022.01)
*G06Q 50/00* (2012.01)
(Continued)

(52) U.S. Cl.
CPC ........... *H04L 65/762* (2022.05); *G06Q 50/01* (2013.01); *H04L 9/3226* (2013.01);
(Continued)

(58) Field of Classification Search
CPC ... H04L 65/1073; H04L 65/403; H04L 65/60; H04L 65/601; H04L 65/602; H04L 65/605; H04L 65/4015; H04L 65/4053; H04L 65/4076; H04L 65/4084; H04L 65/80; H04L 67/1095; H04L 67/325; H04L 9/3226; H04L 9/3297; H04L 2463/101;
(Continued)

(56) References Cited

U.S. PATENT DOCUMENTS

| | | | |
|---|---|---|---|
| 9,282,068 B1 * | 3/2016 | Pan | H04L 65/403 |
| 2010/0274858 A1 * | 10/2010 | Lindberg | G06F 9/452 |
| | | | 715/838 |
| 2015/0134737 A1 * | 5/2015 | Albrecht | H04L 51/52 |
| | | | 709/204 |

* cited by examiner

*Primary Examiner* — Kostas J Katsikis
(74) *Attorney, Agent, or Firm* — NEAL BLIBO LLC

(57) ABSTRACT

A trust network is formed in a communal media system connected to a streaming application and executed within the streaming application. Source location is received for multimedia content selected in the streaming application and transmitted to user devices participating in a communal session. During the communal session, offerings are presented to the user devices in the communal session and user data associated with user interactions with the offerings are obtained and analyzed. Information presented to the user devices in the communal session is optimized based on the user data. Delivery of the multimedia content and social media content generated on the user devices is synchronized. The multimedia content and the social media content are delivered to the user devices at the same time, without any noticeable lag time during receipt of the multimedia content and the social media content by the user devices.

20 Claims, 6 Drawing Sheets

Related U.S. Application Data which is a continuation-in-part of application No. 17/221,886, filed on Apr. 5, 2021, now Pat. No. 11,558,441, which is a continuation of application No. 16/951,404, filed on Nov. 18, 2020, now Pat. No. 11,388,215.

(51) Int. Cl.
*H04L 9/32* (2006.01)
*H04L 65/4053* (2022.01)
*H04L 65/611* (2022.01)
*H04L 65/75* (2022.01)

(52) U.S. Cl.
CPC ........ *H04L 9/3297* (2013.01); *H04L 65/4053* (2013.01); *H04L 65/611* (2022.05)

(58) Field of Classification Search
CPC ............... G06Q 50/01; G06Q 20/1235; G06Q 30/0277; G06Q 2220/18; G06F 21/10; G06F 2221/0713; G06F 16/489; H04W 12/033; H04N 21/4307; H04N 21/43076
See application file for complete search history.

ESTABLISHING TRUST NETWORKS IN A COMMUNAL MEDIA SESSION

CROSS-REFERENCE TO RELATED APPLICATION

The present application is a continuation-in-part of U.S. application Ser. No. 17/533,474 titled "An Integrated System and Method for Executing a Communal Media Session Across Multiple Platforms," filed Nov. 23, 2021, which is a continuation-in-part of U.S. application Ser. No. 17/221,886 titled "An Integrated System and Method for Executing a Communal Media System in a Streaming Application," filed Apr. 5, 2021, which is a continuation of U.S. application Ser. No. 16/951,404 titled "A Multilayer and Synchronized Communal Social Media System and Method," filed Nov. 18, 2020, which claims the benefit of U.S. Provisional Application Ser. No. 16/872,704 titled "A Communal Social Media System and Method," filed May 12, 2020, all of which are incorporated by reference herein in their entirety.

BACKGROUND OF THE INVENTION

Individuals in different locations may watch the same video or other multimedia content using a streaming application, such as Netflix. The streaming application may be integrated with a video-sharing application, for example, a Chrome tele-party extension, so that two or more individuals may stream and watch a video together in the streaming application during a communal session. However, these communal sessions are typically not fully synchronized due to the differences in the network configurations of the devices used to stream the multimedia content. For example, when multiple individuals are simultaneously streaming a video, there are likely to be different lag times on when the video is received on each user's device due to the differences in the configuration of each user's device/network, for example, the bandwidth associated with each user's network.

Moreover, interactions over social media platforms are typically fragmented, wherein some social media platforms may provide one or more video streaming, video sharing, group video chat, and group text as discrete features. Thus, there is a need for an improved system and method of providing multilayer and synchronized social media features on a single platform.

SUMMARY

In some implementations, a communal media system forms a trust network in a communal session. The communal media system includes a processor to execute functions of the communal media system and a memory to store data of the communal session. The communal media system also includes an integration system to integrate and communicatively couple the communal media system with a streaming application and execute the communal media system within the streaming application. The integration system is configured to receive a source location for multimedia content selected in the streaming application and share the source location with a player, in the streaming application, that is configured to transmit the multimedia content to user devices participating in the communal session. The communal media system also may also include an engagement system to present offerings to the user devices in the communal session and obtain user data associated with user interactions with the offerings presented by the engagement system. The engagement system may analyze the user data and optimize information presented to the user devices in the communal session based on the user data.

The communal media system also includes a synchronization system to initiate video playback on the user devices, synchronize delivery, to the user devices, of the multimedia content and social media content generated on the user devices, and exchange playback control messages with the streaming application to direct synchronized transmissions of the multimedia content and social media content from the player to the user devices. The multimedia content and the social media content are delivered to the user devices at a same time, without any noticeable lag time during receipt of the multimedia content and the social media content by the user devices.

In some implementations, a method is provided to form a trust network in a communal session of a communal media system. The method includes communicatively coupling the communal media system with a streaming application and executing the communal media system within the streaming application. The method also includes receiving a source location for multimedia content selected in the streaming application and transmitting the multimedia content to user devices participating in the communal session. During the communal session, the method includes presenting offerings to the user devices in the communal session, obtaining user data associated with user interactions with the offerings, analyzing the user data, and optimizing information presented to the user devices in the communal session based on the user data. The method further includes synchronizing delivery, to the user devices, of the multimedia content and social media content generated on the user devices. The multimedia content and the social media content are delivered to the user devices at the same time, without any noticeable lag time during receipt of the multimedia content and the social media content by the user devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention and explain various principles and advantages of those implementations.

Figure 1A:
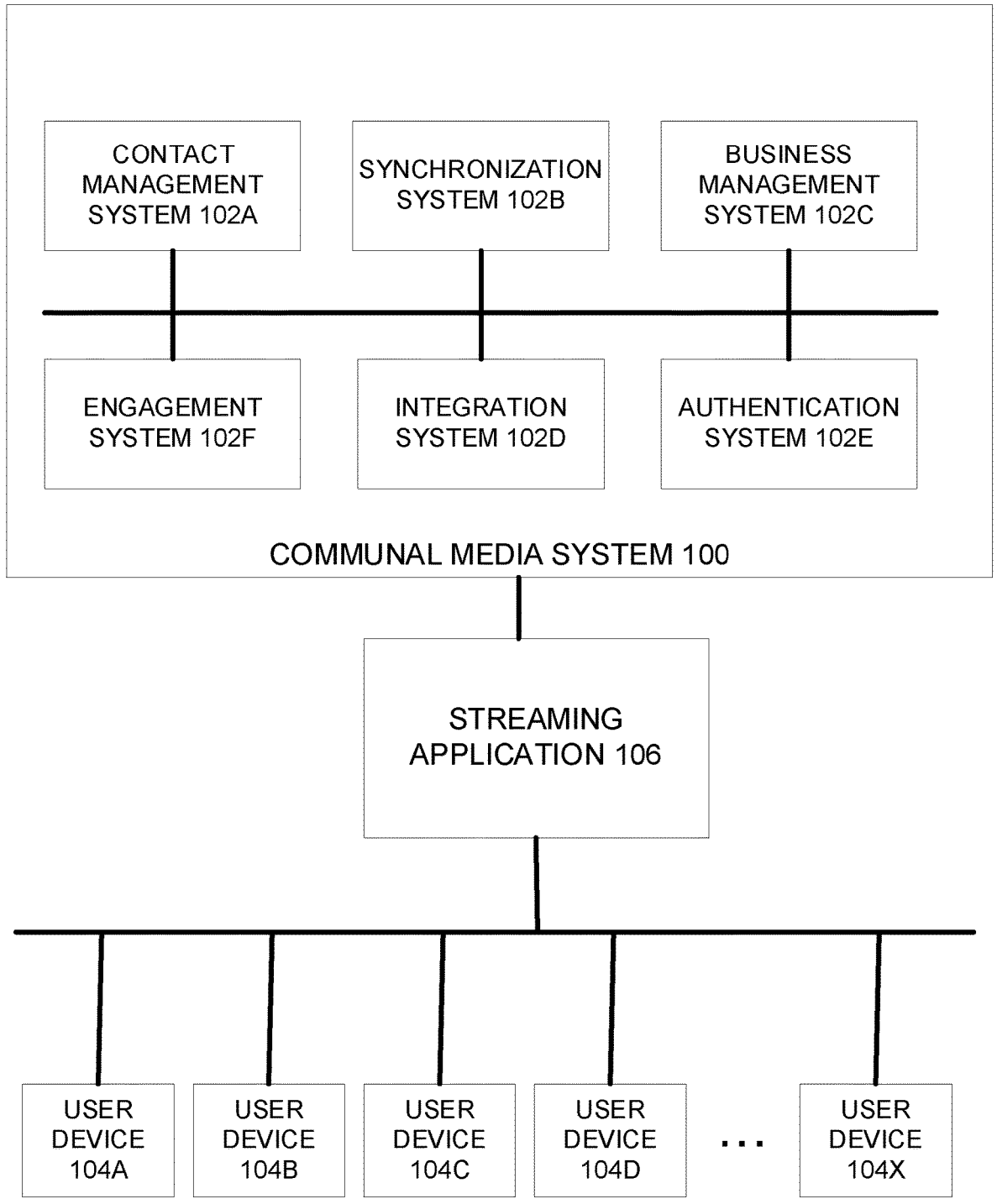
FIGS. 1A and 1B are block diagrams of a communal media system used in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1B:
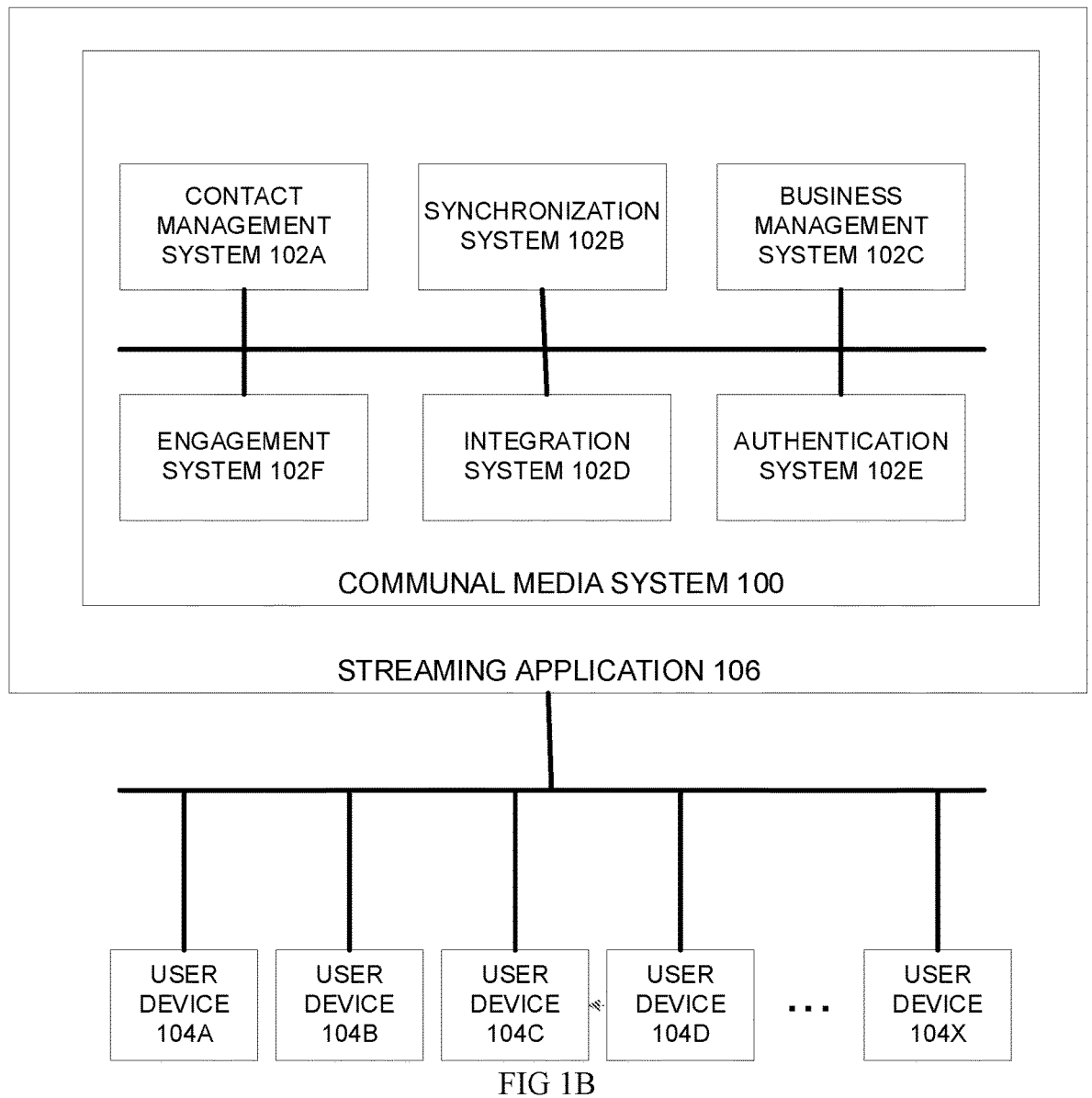

FIGS. 1A and 1B are block diagrams of a communal media system used in accordance with some implementations. Communal media system 100 may include one or more systems 102 (shown as, for example, a contact management system 102a, a synchronization system 102b, a business management system 102c, an integration system 102d, an authentication system 102e, and an engagement system 102f), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Contact management system 102a may manage invitations and notifications to user devices participating in a communal session. Synchronization system 102b may synchronize the delivery of information to user devices during a communal session, such that each of the user devices in the communal session can receive the same information at the same time. Business management system 102c may analyze operations on communal system 100. Integration system 102d may integrate and communicatively couple communal media system 100 with a streaming application 106, such that messages generated on communal media system 100 can be transmitted to the streaming application, and vice versa. Authentication system 102e may authenticate access to subscription content for users participating in a communal session across one or more service platforms. For example, authentication system 102e may authenticate access to the subscription content for users participating in a communal session even if access for participants in the communal session is provided through two or more service platforms. Engagement system 102f may obtain information from users of a communal session and build a trust network based on users' engagement and transaction with communal media system 100.

Communal media system 100 may be integrated with streaming application 106, as shown in FIG. 1B, wherein communal media system 100 may be executed within the streaming application and may operate as a component of the streaming application. Communal media system 100 may also run as a separate system that is communicatively coupled to streaming application 106, as shown in FIG. 1A. Examples of streaming applications may be, for example, Facebook, HBO, Netflix, Hulu, YouTube, a corporate platform, a gaming platform, or other streaming applications including multimedia content that can be streamed to user devices. The multimedia content may be live or recorded multimedia content. Communal media system 100 may synchronize the delivery of the multimedia content transmitted from streaming application 106 with social media content generated on the devices participating in the communal session.

Communal media system 100 and streaming application 106 may be in the same physical location as components on a single computing device or on different computing devices that are communicatively coupled. Communal media system 100, in various implementations, may be disposed in one or more different locations relative to the streaming application 106.

Streaming application 106 may communicate with multiple user devices 104 (shown as, for example, user devices 104a-104x) that may be communicatively coupled to each other and with streaming application 106 and/or communal media system 100. User devices 104 may be stationary devices such as desktops, personal computers, or gaming devices; mobile devices such as mobile phones or tablets; or other computing devices that may be used for viewing multimedia content and interacting with social media applications.

Each user device 104 may be independently configured. For example, user device 104a may operate on the iOS platform and on a 5G network having a first set of specifications, user device 104b may operate on the Android platform on a 5G network having a second set of specifications, user device 104c may operate on the iOS platform and on a 4G network having a first set of specifications, and user device 104d may operate on the iOS platform and on a 4G network having a third set of specifications, where the first, second and third specifications may be different. Despite the differences in the configurations of user devices 104, communal media system 100 may synchronize simultaneous delivery of multimedia content transmitted from the streaming application and other social media content generated on user devices 104, such that each user device 104 receives the multimedia and social media content at the same time during a communal session.

At an initial period, each user device 104a-104x may download and install streaming application 106 from, for example, a mobile app store or the Internet. After installing streaming application 106 on each user device 104, a user device (for example, device 104a) may register with and log-in, by entering authentication/subscription credentials, into streaming application 106 to stream multimedia content from streaming application 106. User device 104a may then select content from streaming application 106. In some implementations, the content selected by user device 104a may require a subscription, and user device 104a may have access to the subscription content based on subscription credentials entered into streaming application 106.

The user of device 104a may also elect to participate in a communal session, wherein the selected content is streamed to user device 104a and to other user devices 104b-104x selected by the user of device 104a to participate in the communal session. To initiate a communal session, host device 104a, i.e., the device that initiated the communal session after selecting content from streaming application 106, may select a communal session feature provided in streaming application 106. After selecting the communal session feature, streaming application 106 may initiate communal media system 100, wherein in cooperation with streaming application 106, communal media system 100 may execute the communal session.

In the example where host device 104a selects the communal session feature to start a communal session, the user of device 104a may select participants for the communal session. For example, the user of device 104a may select the participants for the communal session by entering identifying information such as an email or phone number for each participant or by selecting the participants from a list provided by streaming application 106. If the user of device 104a selects users of devices 104b-104d as participants of the communal session, the content selected by device 104a may be shared/viewed on devices 104a-104d in a communal setting at an appointed time.

When communal media system 100 is initiated, contact management system 102a, via integration system 102d, may retrieve the contact information associated with devices 104b-104d from streaming application 106. For example, contact management system 102a may retrieve the email or telephone number associated with devices 104b-104d from streaming application 106. Contact management system 102a may thereafter send invitations and notifications, through integration system 102d, to devices 104b-104d for the users of devices 104a-104d to participate in the communal session at the appointed time. Integration system 102d may send the invitations directly to user devices 104b-104d or send the invitations via streaming application 106. One or more of the users of devices 104b-104d may accept or reject the invitation. In some implementations, when the communal session is initiated and one or more of devices 104b-104d accepts the invitation, authentication system 102e may authenticate devices 104a-104d in streaming application 106.

In some implementations, when the communal session is initiated and one or more devices 104b-104d accept the invitation, authentication system 102e may provide a list of service providers to devices 104b-104d that accepted the invitation. Devices 104b-104d may be used to select or otherwise enter an external service provider with whom the associated user has a subscription that allows access to the content selected by host device 104a. Device 104b-104d may provide authentication credentials associated with the selected service provider to authentication system 102e. Authentication system 102e may obtain a first validation for users of devices 104b-104d by transmitting the authentication credentials transmitted from devices 104b-104d to the external authentication server. The external authentication server may use the authentication credential to authenticate that device 104b-104d providing the authentication credentials is a subscriber of the service platform selected by device 104b-104d and to validate that the user of device 104b-104d is entitled to access to the subscription content selected by host device 104a.

Alternatively, authentication system 102e may obtain the first validation for devices 104b-104d by directly authenticating the credentials provided by the users of device 104b-104d with the service platform selected by user device 104b-104d and by obtaining confirmation from the service provider that the user is entitled to access to the subscription content selected by host device 104a. If authentication system 102e is unable to obtain the first validation for any of user devices 104b-104d, authentication system 102e may provide, to that user device 104b-104d, an option to purchase a subscription to the content selected by host device 104a.

If host device 104a selects a future time as the appointed time for activating the communal session such that the appointed time is later than the initial period when the communal session was initiated, authentication system 102e may obtain a second validation, for users of each of devices 104a-104d, from the external authentication server or the service platform at the appointed time, wherein the second validation is an indication that each device 104a-104d still has access to view the selected content at the appointed time.

Once authenticated at the appointed time, integration system 102d may obtain the address of user devices 104a-104d running streaming application 106 and participating in the communal session. The address may be an internet protocol (IP) address, a device identifier, an email address, a telephone number, or other information that uniquely identifies device 104a-104d.

Prior to starting the communal session, synchronization system 102b may capture system configuration information from user device 104a-104b and determine if the configuration on the user device meets a predetermined threshold. For example, synchronization system 102b may determine if the bandwidth available for user device 104a-104b is above a predetermined minimum bandwidth threshold. If synchronization system 102b determines that the bandwidth for a user device is below the predetermined minimum bandwidth threshold, synchronization system 102b may determine that the device with bandwidth below the minimum bandwidth threshold cannot be supported and will prevent the device from participating in the communal media session. If synchronization system 102b determines that the bandwidth of a user device 104 is at or above the predetermined threshold, synchronization system 102b may allow the user of that device to participate in the communal media session.

Consider, for example, that synchronization system 102b may evaluate the network/device configuration of user device 104a-104b. Synchronization system 102b may obtain the device configuration, location, network carrier, and/or the network type (for example, WiFi, LTE, 5G) of user device 104a-104d. Synchronization system 102b may also determine the minimum network bandwidth required for a communal session. For example, if synchronization system 102b determines that user device 104a has a bandwidth of 100 Mbps, user device 104b has a bandwidth of 75 Mbps, user device 104c has a bandwidth of 100 Mbps, and user device 104d has a bandwidth of 25 Mbps, synchronization system 102b may determine that the minimum network bandwidth on user devices 104-104d is 25 Mbps. If synchronization system 102b determines that the minimum required network bandwidth is below 25 Mbps, synchronization system 102b may determine that user devices 104-104d meet the network criteria for participating in communal media sessions. Synchronization system 102b may also test the speed of user device 104a-104d and store the information for user device 104a-104d along with a timestamp.

At the start of the communal session, integration system 102d may request that user device 104a-104d activate one or more cameras on the user device. When the cameras on devices 104a-104d are activated, integration system 102d may initiate a video chat session, such that the video chat session is initiated and overlaid on top of the video rendered by the streaming application 402. Integration system 102d may also receive the source location information for the content selected by host device 104a from streaming application 106 and transmit the source location information to a video player in the streaming application, wherein the video player may transmit the selected content to user devices 104a-104d. The source location information may be encrypted or non-encrypted information.

In some implementations, the source location information may be obtained from host device 104a, wherein the source location is based on subscription content accessed by host device 104a. In other implementations, the source location information may be obtained based on subscription content accessed from one of devices 104b-104d selected by host device 104a.

Synchronization system 102b may initiate, via the video player, video playback on user devices 104a-104d and synchronize the simultaneous delivery of multimedia content transmitted from the video player to user devices 104a-104d, such that user devices 104a-104d receive the delivered content at the same time with no noticeable delivery lag, as though each user device is a single device in the same location.

Synchronization system 102b may also synchronize the simultaneous delivery, via the video player, of live videos captured from forward and/or rear cameras on one or more user devices 104a-104d. The synchronized delivery may be sent to those devices 104a-104d not creating the videos, such that each user device 104a-104d receives the delivered video at the same time it is being recorded with no noticeable delivery lag. Synchronization system 102b may simultaneously transmit, via the video player, video chats, texts, emotive responses, and other social media content generated on one of the user devices to other user devices not creating the social media content, wherein the social media content is overlaid on the multimedia content.

Synchronization system 102b may ensure that the multimedia and social media content is synchronized on user devices 104a-104d by exchanging control messages with streaming application 106. As the media is played on devices 104a-104d, the video player may continuously send timestamp receipts and frame identifier acknowledgments of media fragment being played on devices 104a-104d to synchronization system 102b, wherein synchronization system 102b may use the timestamp receipts and frame identifier acknowledgments to synchronize delivery of content across devices 104a-104d.

During the communal session, engagement system 102f may obtain user data from devices 104a-104d participating in the communal session. The user data may be associated with users' engagement/interactions during the communal session. Engagement system 102f may analyze the users' interactions within the communal session in real-time and may use the users' interactions to optimize information and/or provide relevant digital content and/or merchandise to devices 104a-104d participating in the communal session.

In some implementations, engagement system 102f may define or generate benefit and/or loyalty offerings for the communal session and may present the benefit and/or loyalty offerings as rewards in the communal session. Engagement system 102f may include rules for accessing the rewards in the communal session. For example, engagement system 102f may provide tokens, points, or another currency to devices 104a-104d in exchange for engagement in the communal session. A user of device 104a-104d may be given a certain number of tokens when the user participates in the communal session and the user may redeem the tokens for rewards generated by engagement system 102f and provided in the communal session. Users of devices 104a-104d may accumulate tokens in a digital wallet and may redeem any number of tokens at a given time. Engagement system 102f may keep track of tokens associated with a user and/or group.

When users of devices 104a-104d redeem the tokens, engagement system 102f may determine, for example, what a user of device 104a-104d wants, needs, and/or cares about. In some implementations, engagement system 102f may provide multiple reward categories to participants of the communal session, with each category designed to obtain behavioral and/or psychological information associated with the user of device 104a-104d. For example, the first category may include rewards for events, digital content, merchandise, etc., wherein engagement system 102f may use the rewards redeemed from the first category to determine a user's taste and/or preferences. Engagement system 102f may use rewards presented in a second category to determine what a user values. For example, the second category may include rewards for educational, career, and/or healthcare opportunities, and/or other goods/services that a user of device 104a-104d may value. Engagement system 102f may use rewards presented in a third category to determine what the user cares about. For example, the third category may include rewards associated with a given charity and/or corporate community service program.

A user of device 104a-104d may select a reward from any of the categories, wherein the reward may be redeemed at a future date and the value of the reward may accumulate based on the user's participation in the communal session until the reward is redeemed. For example, the second category may include an internship that goes into effect when the user completes certain tasks and the third category may include a scholarship, the value of which may accumulate over time based on future participation by the user.

Based on the rewards selected from one or more categories, engagement system 102f may determine user attributes at an individual (user) level and/or at a community (group) level. Consider an example, where users of devices 104a-104d are participating in the communal session through a streaming application associated with a sports league. If the users of devices 104a-104d are watching a sporting event in a communal session, engagement system 102f may provide tokens to devices 104a-104d, wherein devices 104a-104d may be given a certain number of tokens when the users of devices 104a-104d participate in the communal session. Users of devices 104a-104d may accumulate the tokens or use the tokens to purchase rewards presented in the communal session.

Engagement system 102f may present the rewards in different categories to the user individually and/or as a group, wherein the user may, individually and/or as a group, select a reward from one or more categories. In this example, engagement system 102f may present sports merchandise, tickets, and other goods in the first category; scholarships or internships being offered by the sports league in the second category; and charity organizations in collaboration with the sports league in the third category. Content providers may thus use one or more categories in the communal media system 100 to highlight or advertise rewards, affiliations, and other background information.

Using the rewards selected from the first category, engagement system 102f may determine the user and/or group preferences, for example, for content and/or merchandise; using the rewards selected from the second category, engagement system 102f may determine, for example, what the user and/or group values; and using the rewards selected from the third category, engagement system 102f may determine, for example, the charitable causes that the user and/or group cares about.

Based on the selections of the user and/or group, engagement system 102f may continuously optimize the rewards presented to the user and/or group in the communal session, such that engagement system 102f may present rewards that are relevant to the user and/or group. Engagement system 102f may also use the selections of the user and/or group in the communal session to optimize content provided to the user and/or group and/or execute functions for the user and/or group. For example, suppose over time engagement system 102*f* determines that the users of devices 104*a*-104*d* are family members who redeem their tokens during the holidays by contributing to a specific charity. Engagement system 102*f* may automatically generate a contribution to the charity during the holidays for the users of devices 104*a*-104*d* and may request confirmation from the users of devices 104*a*-104*d*.

Engagement system 102*f* may also use the rewards redeemed by the user and/or group in the communal session to generate a social graph that indicates relationships between participants in the communal session. In the example where the users of devices 104*a*-104*d* are family members, engagement system 102*f* may also use the selections of the user and/or group to generate a social graph that indicates relationships between participants in the communal session.

Engagement system 102*f* may also use the selections of the user and/or group to generate a comprehensive psychographic data link, for example, to time and location. For example, engagement system 102*f* may use the user and/or group location and preferences to optimize rewards, content, and/or functions of communal media system 100. Engagement system 102*f* may also use the user and/or group selections to analyze brand sentiment across the communal media system 100 and other social media platforms.

Engagement system 102*f* may allow the users of devices 104*a*-104*d* in the communal session to register and/or opt into the reward system. This ensures a fair exchange, wherein in return for the user data, engagement system 102*f* may provide content and other merchandise that is valuable to the users of devices 104*a*-104*d*, thus building a trust network in the communal session.

Engagement system 102*f* may store user information, engagement information, relationship information, preferences, user opt-ins, and other information relating to the communal session for a predefined period.

When the communal session concludes, the video player may transmit a completion message to integration system 102*d*. Communal media system 100 may then close the video chat session and transfers control to streaming application 402. Business management system 102*c* may then obtain and/or analyze data associated with the session.

In an implementation, a user associated with a device 104*a*-104*d* may create a profile photo of the user, record an image of the user, or create an avatar that may represent an image of the user, wherein the avatar may mimic the user's actions, including speaking and other actions performed by the user. The avatar or other images of users associated with devices 104*a*-104*d*, video chats, texts, emotive responses, and other social media features generated on devices 104*a*-104*d* may be overlaid on the delivered multimedia content during the communal session. This enables the users of devices 104*a*-104*d* to view the multimedia content and social media interactions at the same time, without any noticeable lag time associated with receipt of the multimedia and social media content at user devices 104*a*-104*d*. Other content such as targeted advertisement and recommendations based on previous usage on one or more user device 104*a*-104*d* may also be overlaid on the delivered multimedia content.

In an implementation, the host device may pause, rewind, or fast forward the multimedia content, wherein synchronization system 102*b* may also ensure that the pause, rewind, or fast-forward action is synchronized across all user devices.

In an implementation, the host may make the communal session live to the public by activating a live button on the user interface. Once the session is live, users of other devices, for example, devices 104*e*-104*x* that are accessing communal media system 100 may view and participate in the session by sending texts, emotive responses, and other social media features generated on those user devices 104*e*-104*x*. The live session may have a ticker counter to identify how many users are participating in the live session.

In some implementations, a thumbnail image of the selected content may be provided in communal media system 100. Users of devices 104*a*-104*d* may manipulate the thumbnail images by, for example, moving, resizing, or deleting the image on the user interface. As indicated above FIG. 1 is provided as an example. Other examples may differ from what is described in FIG. 1.

Figure 2:
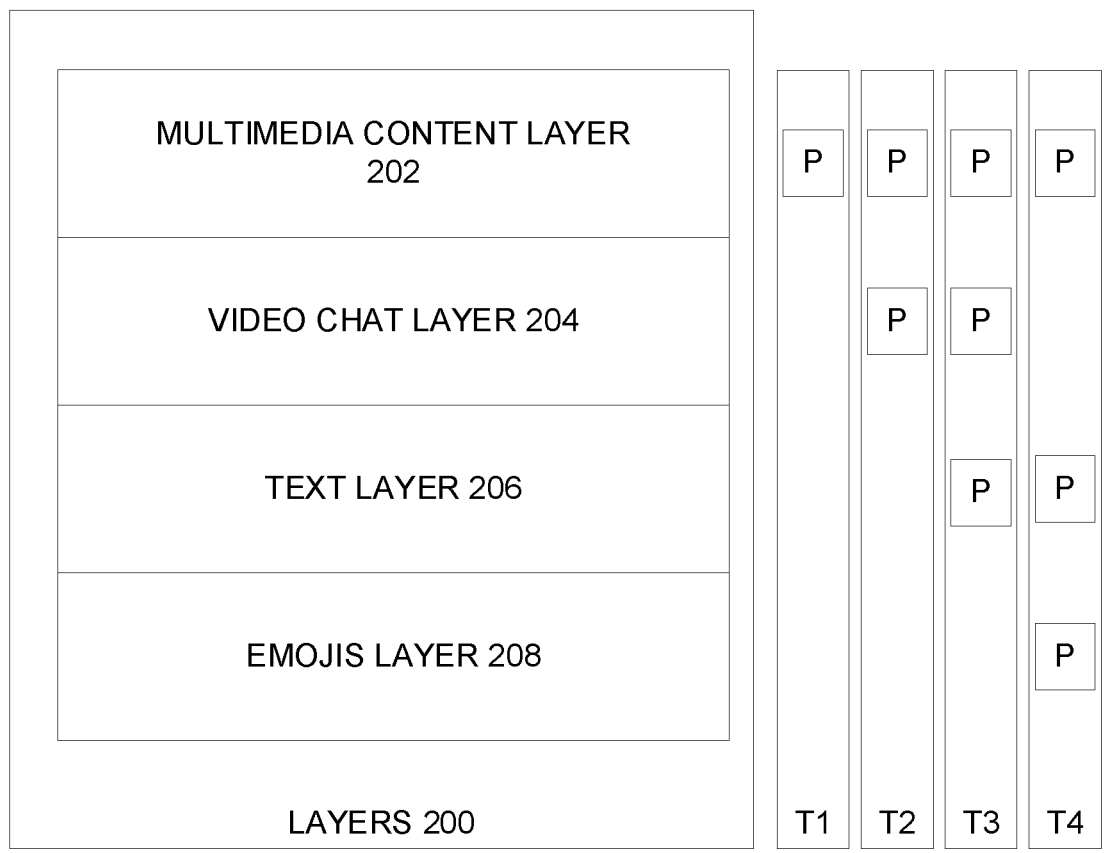
FIG. 2 is a block diagram of how packets are structured and delivered in the communal media system in accordance with some implementations.

FIG. 2 is a block diagram of how packets are structured and delivered in the communal media system 100 in accordance with some implementations. Synchronization system 102*b* may separate content transmitted over communal media system 100 into multiple layers 200 and synchronize delivery of the multiple layers to user devices 104*a*-104*d*, i.e., those user devices registered to participate in the session on communal media system 100. For example, synchronization system 102*b* may configure the multimedia content selected from streaming application 402 in a multimedia content layer 202, video chats received from user devices 104*a*-104*d* in a video chat layer 204, texts received from user devices 104*a*-104*d* in a text layer 206, and emojis received from user devices 104*a*-104*d* in an emojis layer 204. It should be apparent that synchronization system 102*b* may separate content transmitted over communal media system 100 into more or fewer layers than layers 202-208.

After separating the content into layers 200, synchronization system 102*b* may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102*b* may also synchronize voice and video packets in video streams in multimedia content layer 202 and voice and video packets in video chat layer 204 so that there is no lag time between the voice and the video packets in each layer. As such, synchronization system 102*b* may synchronize the delivery of packets in the same layer and the delivery of multiple layers of content across disparate devices and disparate access networks so that all user devices 104*a*-104*d* may receive content delivered over communal media system 100 at the same time.

Consider, for example, that synchronization system 102*b* has packets (P) in different layers that are to be delivered at times T1-T4, as shown in FIG. 2. At T1, the packets in multimedia content layer 202 may be delivered first. At T2, the packets in multimedia content layer 202 may be delivered before the packets in video chat layer 204. At T3, the packets in multimedia content layer 202 may be delivered first, the packets in video chat layer 204 may be delivered second, and the packets in text layer 206 may be delivered last. At T4, the packets in multimedia content layer 202 may be delivered first, the packets in text layer 206 may be delivered second, and the packets in emoji layer 208 may be delivered last. As indicated above FIG. 2 is provided as an example. Other examples may differ from what is described in FIG. 2.

Figure 3:
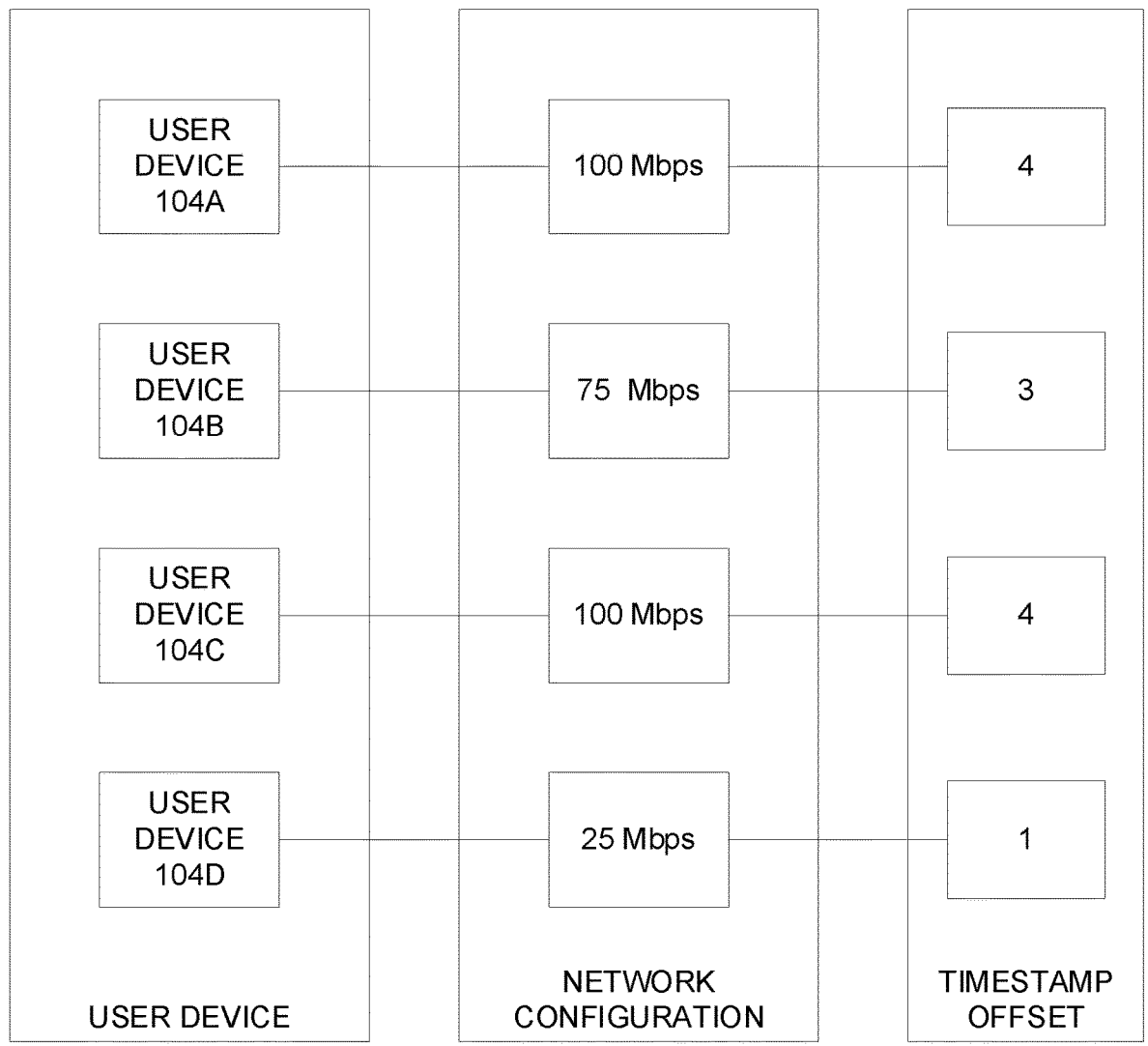
FIG. 3 is a block diagram of a timestamp structure used in accordance with some implementations.

FIG. 3 is a block diagram of a timestamp structure used in accordance with some implementations. When content is being transmitted over communal media system 100, at pre-determined time intervals during the session, synchronization system 102b may continuously receive timestamp receipts from each user device 104a-104d. The timestamp receipts may include timestamps of when a predefined number of packets is received by a user device and timestamps of when a predefined number of packets is sent from the device. The interval for delivering and/or receiving timestamp receipts may be static or dynamic. Static delivery may involve delivering and/or receiving timestamp receipts at predefined intervals (e.g., every 100 mms) and dynamic delivery may involve adapting delivery and/or receipt of timestamp receipts according to the various speeds of the heterogeneous networks of user devices 104a-104d.

Synchronization system 102b may determine a timestamp offset for each user device 104a-104d and for each type/layer of content (video stream, video chat, text and emojis) delivered. In some implementations, the timestamp offset may be based on a predetermined minimum network configuration and/or the timestamp receipts, wherein synchronization system 102b may adjust packet deliveries to correspond with the timestamp offset of each user device 104a-104d. Continuing with the example where user device 104a has a bandwidth of 100 Mbps, user device 104a has a bandwidth of 75 Mbps, user device 104a has a bandwidth of 100 Mbps, and user device 104a has a bandwidth of 25 Mbps, synchronization system 102b may set the timestamp offset for user devices 104a-104d based on the lowest bandwidth, as shown in FIG. 3. Accordingly, the timestamp offsets for user device 104a and 104c may be set to four times the timestamp offset of user device 104d and the timestamp offset for user device 104b may be set to three times the timestamp offset of user device 104d, This ensures that when packets are delivered using the timestamp offsets, synchronization system 102b can normalize the delivery of packets to all user devices 104a-104d (i.e., take care of propagation delays or speed up delivery based on the bandwidth). In this manner, all user devices 104a-104d will receive multimedia and social media contents at the same time and without any noticeable delay in receipt of the content among the devices, ensuring that users of devices 104a-104d are viewing and interacting with the content as if they were in the same physical location and viewing the content on the same device.

In addition to sending and receiving timestamp receipts to and from devices 104a-104d, synchronization system 102b may also send and/or receive information associated with frame and/or fragment of the multimedia content to devices 104a-104d. Continuing with the example above, before the viewing session begins, integration system 102d may request, from streaming application 402, a location of a manifest file including multimedia content for a communal viewing session. Streaming application 402 may provide information including, for example, a Uniform Resource Locator (URL) of the manifest file, the name of the manifest file and/or the file itself. Media fragments of, for example, three to six seconds of the multimedia content, may be stored in the manifest file. Based on resolution, each second of the media fragment may include, for example, twenty-four to sixty frames of full motion video and each frame may include a unique frame identifier. Before the communal session, synchronization system 102b may send the URL for the manifest file, via streaming application 106, to user devices 104a-104d participating in the communal session.

In addition to and/or in lieu of timestamp receipts transmitted to and from devices 104a-104d, synchronization system 102b may use the frame identifiers in the media fragments transmitted to and from devices 104a-104d to synchronize delivery of the media to devices 104a-104d. Consider, for example, that during the viewing session, synchronization system 102b may transmit a fragment with twenty-four frames, with each successive frame assigned an identifier from 1-24. Also consider that at time T1, synchronization system 102b may transmit frames 1-10 to devices 104a-104d, and at time T2, synchronization system 102b may transmit frames 11-20 to devices 104a-104d. Between T1 and T2 synchronization system 102b may receive frame identifier acknowledgments of the receipts of frames 1-10 from devices 104a-104d. If synchronization system 102b receives a frame identifier acknowledgment of the receipt of frames 1-10 from devices 104a-104b, a frame identifier acknowledgment of the receipt of frames 1-7 from device 104c, and a frame identifier acknowledgment of the receipt of frames 1-8 from devices 104d, at T2, rather than send frames 8-10 to device 104c and frames 9 and 10 to device 104d, synchronization system 102b may transmit frames 11-20 to devices 104a-104d, thereby synchronizing delivery of the frames to devices 104a-104b with the delivery of the frames to devices 104c-104d.

In some implementations, at the start of the communal session, the video player may start to play the media fragments stored in the manifest file for host device 104a in an order determined, for example, by information obtained from the manifest file. At the start of the communal session in host device 104a, the video player may record a timestamped receipt for the start time, for example, in milliseconds or seconds, and may send the timestamped receipt and the frame number of the media fragment being played to synchronization system 102b. As the media is played in host device 104a, the video player may continuously send timestamp receipts and/or frame identifier acknowledgments of media fragment being played to synchronization system 102b. Synchronization system 102b may record the frame identifier acknowledgments, timestamp receipts, and/or the timestamp offset of host device 104a.

At the start of the communal session, the video player may also receive the start time for playing the media in user devices 104b-104d from synchronization system 102b. When the media playback starts, the video player may provide, to synchronization system 102b, a timestamped receipt of the start time of the media playback on each user device 104b-104d and the frame identifier acknowledgment of the media fragment(s) received by each user device 104b-104d. During the communal session, the video player may also provide the progress of the media playback on a predetermined basis for each user device 104b-104d to synchronization system 102b. Synchronization system 102b may review and compare the locations in the media being played on user devices 104a-104d on a pre-determined basis. Synchronization system 102b may continuously determine that the media being played on user devices 104a-104d are synchronized within a pre-determined period, for example, a pre-determined number of milliseconds or seconds. Synchronization system 102b may ensure that the media is synchronized on user devices 104a-104d by exchanging control messages with streaming application 402. Synchronization system 102b may dynamically adjust the pre-determined period to ensure the quality of the multimedia content. Synchronization system 102b may also ensure that the media being played on user devices 104b-104d is not ahead of the media being played on host device 104a.

The video player may continuously send timestamp receipts and/or the frame identifier acknowledgments for fragment(s) played on each user device 104a-104d to synchronization system 102b. If the media being played on any of user devices 104a-104d falls behind a certain threshold, synchronization system 102b may provide signaling messages to streaming application 106. Synchronization system 102b may make necessary adjustments in transmitting the media to user devices 104a-104d, for example, either by instructing the video player to marginally slow the media being played to one or more devices or by accelerate the media being played to one or more devices, until all the devices are on the same frame. By making the necessary adjustments in transmitting the media to user devices 104a-104d, synchronization system 102b may ensure that the media is transmitted and played on all devices within acceptable tolerances.

If host device 104a rewinds the media being played on device 104a, the time offset associated with host device 104a and/or frame number associated with the content may be adjusted continuously until host device 104a stops rewinding the media and playing the media resumes. Similarly, if host device 104a fast forwards the media being played on device 104a, the time offset and/or frame number may be adjusted continuously until device 104a stops fast-forwarding the media and playing the media resumes. The rewind or fast-forward offset may be sent to synchronization system 102b for adjustments of the transmissions on the other devices 104b-104d in the communal session. If host device 104a pauses the media being played on device 104a, a message may be sent to synchronization system 102b, and transmissions of the media may be paused, such that a pause action on device 104a may pause the playing of the media on all user devices 104b-104d at the same time.

In addition to performing initial configurations tests, including a speed test, on each user device 104a-104d to determine that the configuration of the user device meets the minimum network threshold at the start of a session, synchronization system 102b may perform periodic speed tests (for example, on an as-needed basis or at predefined intervals) on each user device 104a-104d. As indicated above FIG. 3 is provided as an example. Other examples may differ from what is described in FIG. 3.

Figure 4:
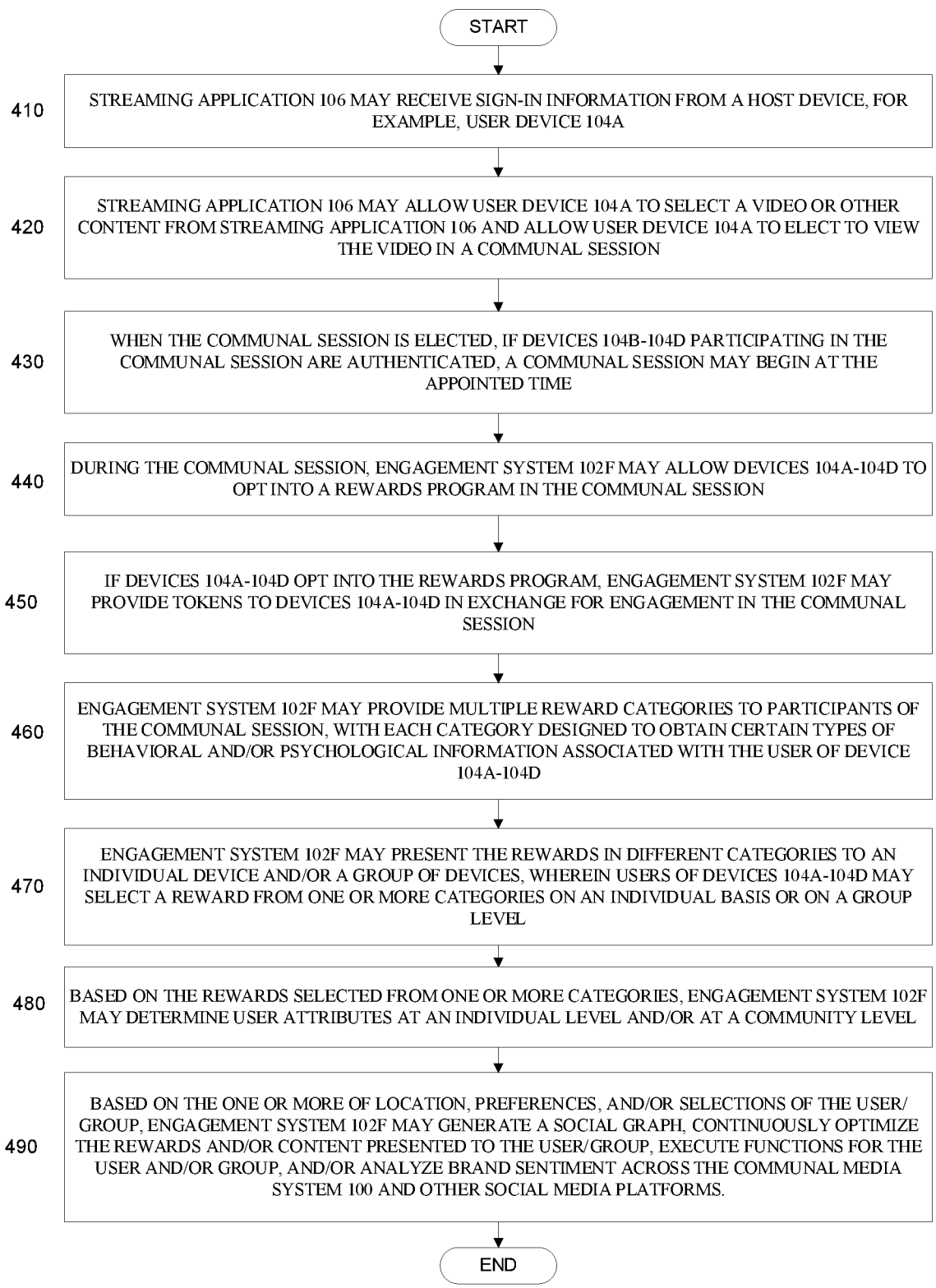
FIG. 4 is a flowchart of a method for optimizing content in a communal session based on user input during the communal session in accordance with some implementations.

FIG. 4 is a flowchart of a method for optimizing content in a communal session based on user input during the communal session in accordance with some implementations. At 410, streaming application 106 may receive sign-in information from a host device, for example, user device 104a. At 420, streaming application 106 may allow user device 104a to select a video or other content from streaming application 106 and allow user device 104a to elect to view the video in a communal session. At 430, when the communal session is elected, if devices 104b-104d participating in the communal session are authenticated, a communal session may begin at the appointed time. At 440, during the communal session, engagement system 102f may allow devices 104a-104d to opt into a rewards program in the communal session.

At 450, if devices 104a-104d opt into the rewards program, engagement system 102f may provide tokens to devices 104a-104d in exchange for engagement in the communal session. At 460, engagement system 102f may provide multiple reward categories to participants of the communal session, with each category designed to obtain certain types of behavioral and/or psychological information associated with the user of device 104a-104d. At 470, engagement system 102f may present the rewards in different categories to an individual device and/or a group of devices, wherein users of devices 104a-104d may select a reward from one or more categories on an individual basis or on a group level.

At 480, based on the rewards selected from one or more categories, engagement system 102f may determine user attributes at an individual level and/or at a community level. At 490, based on the one or more of location, preferences, and/or selections of the user/group, engagement system 102f may generate a social graph, continuously optimize the rewards and/or content presented to the user/group, execute functions for the user and/or group, and/or analyze brand sentiment across the communal media system 100 and other social media platforms. As indicated above FIG. 4 is provided as an example. Other examples may differ from what is described in FIG. 4.

Figure 5:
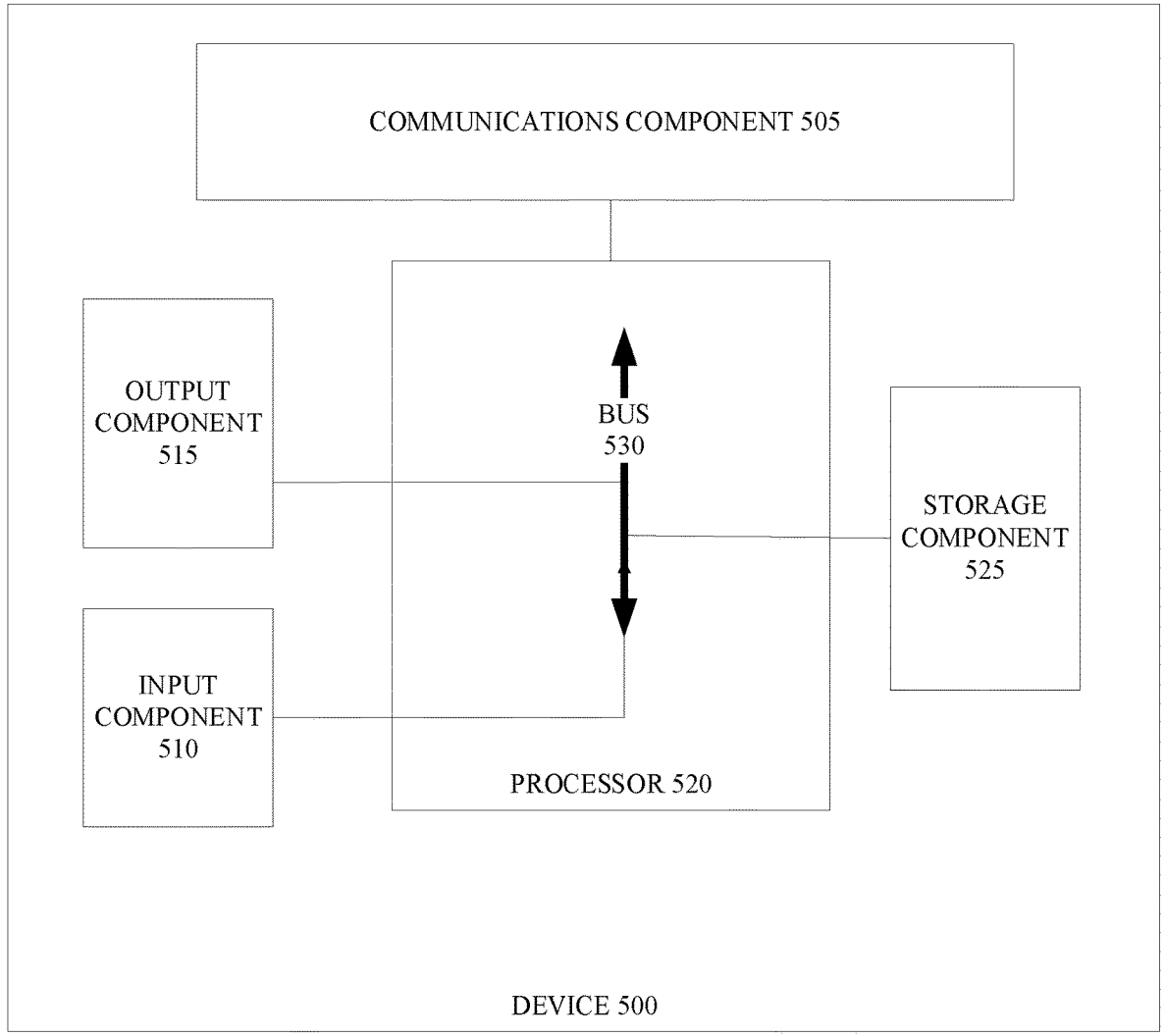
FIG. 5 is a diagram of example components of one or more devices of FIG. 1. implementations.

FIG. 5 is a diagram of example components of one or more devices of FIG. 1. In some implementations, communal media system 100 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In the foregoing specification, specific implementations have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communal media system to form a trust network in a communal session, the communal media system comprising one or more processors to execute functions of the communal media system and a memory to store data of the communal session, the communal media system, comprising:
    an integration system including a processor to integrate and communicatively couple the communal media system with a streaming application, wherein an initiator included within the streaming application executes the communal media system within the streaming application, wherein the integration system receives a source location for multimedia content selected in the streaming application and share the source location with a player, in the streaming application, that transmits the multimedia content to user devices participating in the communal session;
    an engagement system including a processor to present offerings to the user devices in the communal session, obtain user data associated with user interactions with the offerings presented by the engagement system, analyze the user data, and optimize information presented to the user devices in the communal session based on the user data; and
    a synchronization system including a processor to initiate video playback on the user devices, synchronize delivery, to the user devices, of the multimedia content and social media content generated on the user devices, and exchange playback control messages with the streaming application to direct synchronized transmissions of the multimedia content and social media content from the player to the user devices,
    wherein the multimedia content and the social media content are delivered to the user devices at a same time, without any noticeable lag time during receipt of the multimedia content and the social media content by the user devices.

2. The communal media system of claim 1, wherein the engagement system includes rules to access the offerings, wherein the rules include providing a certain number of tokens to the user devices in exchange for engagement in the communal session.

3. The communal media system of claim 1, wherein the engagement system provides the offerings in a plurality of categories, each of which is generated to identify at least one of behavioral and psychological information associated with users of the user devices.

4. The communal media system of claim 3, wherein the engagement system uses offerings in a first category to determine at least one of a taste and preferences of a user participating in the communal session; offerings in a second category to determine what the user values; and offerings in a third category to determine what the user cares about.

5. The communal media system of claim 1, wherein the engagement system allows the offerings to be redeemed at a future date, where a value of the offerings may accumulate based on a user's participation in the communal session until the offerings is redeemed.

6. The communal media system of claim 1, wherein, in analyzing the user data, the engagement system determines user attributes at, at least one of, a user level and group level.

7. The communal media system of claim 1, wherein the engagement system presents the offering at, at least one of, a user level and a group level, wherein a user selects an offering at, at least one of, the user level and the group level.

8. The communal media system of claim 1, wherein the engagement system optimizes at least one of the offerings and content based on the user data.

9. The communal media system of claim 1, wherein the engagement system executes a function in the communal session based on the user data.

10. The communal media system of claim 1, wherein the engagement system uses the user data to generate a social graph that indicates relationships between participants in the communal session.

11. The communal media system of claim 1, wherein the engagement system uses the user data to generate a psychographic data link to at least one of time and location.

12. The communal media system of claim 1, wherein the engagement system uses the user data to analyze brand sentiment across multiple platforms.

13. The communal media system of claim 1, wherein the engagement system allows the user devices to opt-in to a reward system.

14. A method of forming a trust network in a communal session of a communal media system comprising a processor to execute functions of the communal media system and a memory to store data of the communal session, the method, comprising:
    communicatively coupling the communal media system with a streaming application and executing the communal media system within the streaming application,
    receiving a source location for multimedia content selected in the streaming application and sharing the source location with a player, in the streaming application, that transmits the multimedia content to user devices participating in the communal session;
    during the communal session, presenting offerings to the user devices in the communal session;
    obtaining user data associated with user interactions with the offerings;
    analyzing the user data;
    optimizing information presented to the user devices in the communal session based on the user data; and
    synchronizing delivery, to the user devices, of the multimedia content and social media content generated on the user devices,
    wherein the multimedia content and the social media content are delivered to the user devices at a same time, without any noticeable lag time during receipt of the multimedia content and the social media content by the user devices.

15. The method of claim 14, further comprising providing a certain number of tokens to the user devices in exchange for engagement in the communal session.

16. The method of claim 14, further comprising providing the offerings in a plurality of categories, each of which is generated to identify at least one of behavioral and psychological information associated with users of the user devices,
    wherein a first category is used to determine at least one of a taste and preferences of a user participating in the communal session; a second category is used to determine what the user values; and a third category is used to determine what the user cares about.

17. The method of claim 14, further comprising allowing the offerings to be redeemed at a future date, where a value of the offerings may accumulate based on a user's participation in the communal session until the offerings is redeemed.

18. The method of claim 14, further comprising determining user attributes at, at least one of, a user level and group level and presenting the offering at, at least one of, the user level and the group level.

19. The method of claim 14, wherein the optimizing comprises at least one of optimizing at least one of the offerings and content based on the user data and executing a function in the communal session based on the user data.

20. The method of claim 14, further comprising at least one of using the user data to generate a social graph that indicates relationships between participants in the communal session, to generate a psychographic data link to at least one of time and location, and to analyze brand sentiment across multiple platforms.

* * * * *